(12) United States Patent
Victoria

(10) Patent No.: US 9,052,408 B2
(45) Date of Patent: Jun. 9, 2015

(54) METHOD AND SYSTEM FOR DETECTING GEOMETRY VARIATIONS OF SEISMIC REFLECTIONS

(76) Inventor: Marcos Victoria, Port of Spain (TT)

(*) Notice: Subject to any disclaimer, the term of this patent is extended or adjusted under 35 U.S.C. 154(b) by 857 days.

(21) Appl. No.: 13/306,648

(22) Filed: Nov. 29, 2011

(65) Prior Publication Data

US 2013/0135967 A1    May 30, 2013

(51) Int. Cl.
     *G01V 1/30*      (2006.01)
     *G01V 1/28*      (2006.01)

(52) U.S. Cl.
     CPC . *G01V 1/302* (2013.01); *G01V 1/28* (2013.01); *G01V 1/306* (2013.01); *G01V 1/307* (2013.01)

(58) Field of Classification Search
     CPC ............ G01V 1/28; G01V 1/30; G01V 1/306
     USPC .................................. 367/38, 47; 702/13, 14
     See application file for complete search history.

(56) References Cited

U.S. PATENT DOCUMENTS

| | | | |
|---|---|---|---|
| 4,945,519 A * | 7/1990 | Stanley et al. ................. | 702/16 |
| 5,383,114 A * | 1/1995 | Chambers ...................... | 367/38 |
| 5,940,778 A | 8/1999 | Marfurt et al. | |
| 7,616,524 B1 | 11/2009 | Gersztenkorn | |
| 2011/0295510 A1 * | 12/2011 | Gulati ............................ | 702/16 |

OTHER PUBLICATIONS

M.T. Taner, et al. "Complex seismic trace analysis" Geophysics, vol. 44, No. 6, Jun. 1979, pp. 1041-1063.
M.T. Taner, et al. "Application of Amplitude, Frequency, and Other Attributes to Stratigraphic and Hydrocarbon Determination" C.E. Payton, ed. Applications to hydrocarbon exploration: American Association of Petroleum Geologists Memoir 26, pp. 301-327.
Satinder Chropra, et al. "Seismic attributes—A historical perspective", Geophysics, vol. 70, No. 5, Sep.-Oct. 2005, pp. 3SO-28SO.
Arthur E. Barnes, "The complex seismic trace made simple", The Leading Edge, Apr. 1998.

* cited by examiner

*Primary Examiner* — Ian J Lobo
(74) *Attorney, Agent, or Firm* — Christopher & Weisberg, P.A.

(57) ABSTRACT

A method, system and a computer readable medium to compute geometric reflectivity enhancement (GRE) distributions based on seismic data are disclosed. The GRE distributions may be derived from absolute values of a seismic trace amplitude and a quadrature signal obtained by computing the Hilbert transform of the seismic trace amplitude. The derived GRE distributions preserve zero crossings and peaks of the seismic amplitude data.

20 Claims, 8 Drawing Sheets

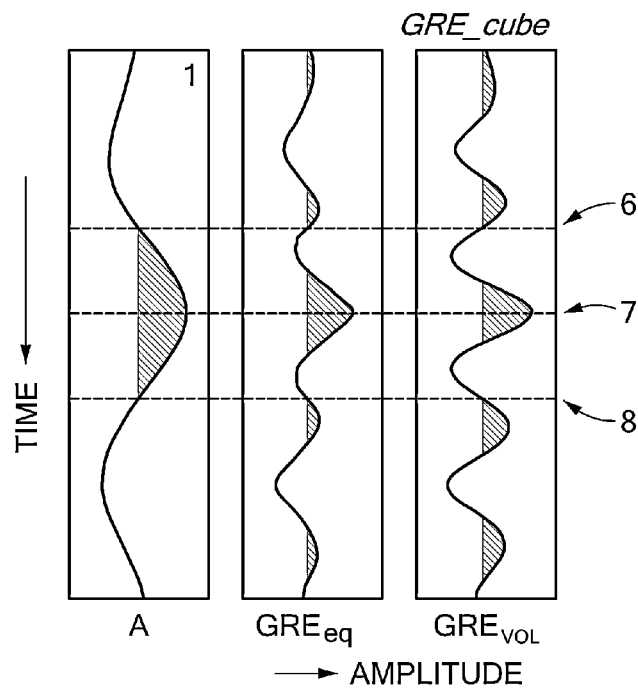
FIG. 5
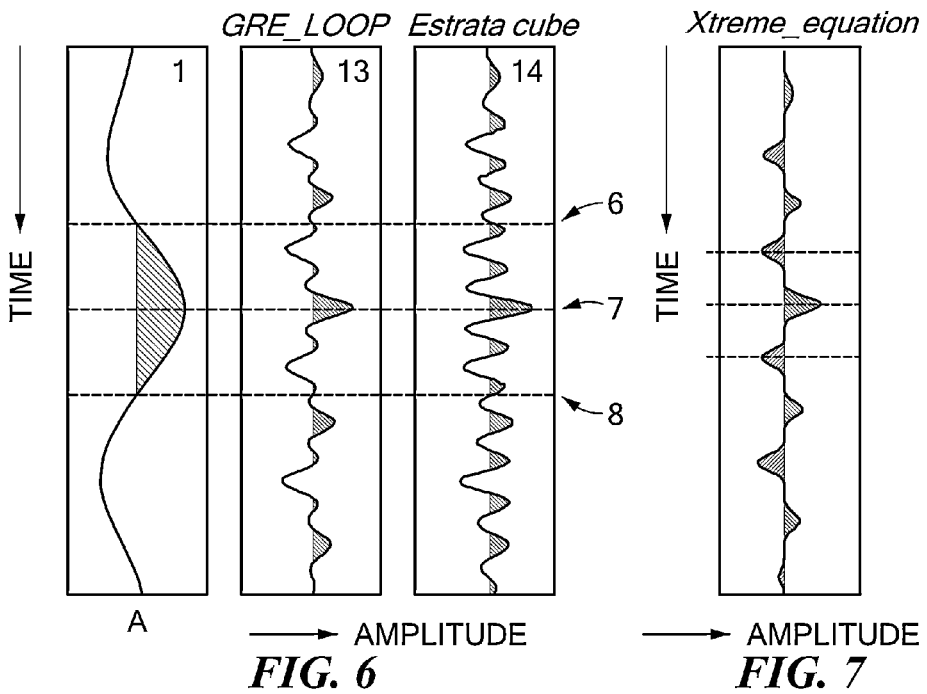
FIG. 6
FIG. 7

METHOD AND SYSTEM FOR DETECTING GEOMETRY VARIATIONS OF SEISMIC REFLECTIONS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to detecting internal geometrical variations of seismic reflectors, and more particularly toward a method and system for generating a series of seismic volumes that can be used to identify fault and stratigraphic features below the surface of the earth.

BACKGROUND OF THE INVENTION

A field of seismology focuses on the use of acoustic waves to prospect for hydrocarbon sandstones, carbonates, and shale reservoirs. Exploration seismology provides information that, when integrated with other geological information, can provide an understanding of the structure and distribution of types of subsurface materials. For example, most oil companies rely on seismic interpretation to select sites for drilling exploratory oil wells or to develop known sites.

Although seismic data is used to map geological structures rather than to find petroleum directly, the gathering of seismic data has become a vital part of the process of selecting sites for further exploration and drilling. Experience has shown that the use of seismic data greatly improves the accuracy of structural and stratigraphic maps and reduces the risks of uncertainty when drilling new prospects.

In order to search for hydrocarbon accumulations in the earth, geoscientists are using methods of remote sensing to look below the earth's surface. A routinely used technique is the seismic reflection method where man-made sound waves are generated near the surface. The sound propagates into the earth, and whenever the sound passes from one rock layer into another, a small portion of the sound is reflected back to the surface where it is recorded. Typically, hundreds to thousands of recording instruments are employed. Sound waves are sequentially excited at many different locations. From all these recordings, a two- or three-dimensional image of the subsurface can be obtained after significant data processing.

Measurements derived from these data are called seismic attributes. The most commonly used attribute is amplitude of the recorded sound waves because it allows identification and interpretation of many subsurface features such as the boundaries between different rock layers. Many other properties of the subsurface, however, are not sufficiently identifiable on images of basic seismic amplitude.

Several types of seismic attributes are useful, such as those disclosed in "*Complex Seismic Trace Analysis*" by Tanner, Koehler, and Sheriff 1979, *Geophysics*, vol. 44, no. 6, pp. 1041-1063", incorporated herein by reference in its entirety. The instantaneous phase attribute, for example, is generally insensitive to amplitude and measures the continuity of seismic events. It can be used to show subtle non-conformities where subsurface layers are truncated by an erosion surface. Further, an apparent polarity attribute has been used to discern between gas and water reservoirs. A reflection strength attribute has been used to discern between chalk (high amplitude) and sands/shales (low amplitude). Such attributes are known as complex trace attributes and are derived by using the Hilbert transform.

The seismic trace amplitude, herein referred to by the capital letter, A, is treated as the real part of the (complex) analytical signal while the imaginary part of the signal, herein referred to by the capital letter, Q, is computed by taking the Hilbert transform of the amplitude, A. An envelope is computed by taking the square root of the sum of the squares of the real and imaginary components, A and Q, whereas the phase, herein referred to by the capital letter, I, is computed by taking the inverse tangent of the imaginary and real components. Finally, the frequency is computed as the rate of change of the phase, I.

These computations may be carried out at each sample of the seismic trace. Three principal attributes—envelope, phase and frequency—have been established in the field of seismic interpretation:

1) Instantaneous envelope (reflection strength), which is sensitive to changes in acoustic impedance and thus to lithology, porosity, hydrocarbons, and thin-bed tuning;

2) Instantaneous phase, which is useful for tracking reflector continuity and, therefore, for detecting unconformities, faults and lateral changes in stratigraphy; and 3) Instantaneous frequency, which is useful in identifying abnormal attenuation and thin-bed tuning.

However, these principle attributes are deficient to show many of the internal features of a subsurface structure. What is needed are methods for computing other attributes of seismic data that will enhance an ability to discern features of subsurface structures.

SUMMARY OF THE INVENTION

The present invention advantageously provides a method and system for detecting geological features based on seismic data. According to one aspect, a seismic amplitude signal A and a seismic quadrature signal Q is processed to produce a geometric reflectivity enhancement (GRE) distribution indicative of geological features. The processing includes computing a difference of absolute values of the A and Q signals, and a difference of absolute values of phase-shifted A and Q signals, $A_{90}$ and $Q_{90}$, as follows:

$$C = abs(A) - abs(Q)$$

$$D = abs(A_{90}) - abs(Q_{90})$$

The GRE distribution, denoted herein as GRE_equation is computed as follows:

$$\text{GRE\_equation} = (C-D)\cos(abs(I))$$

where I is the instantaneous phase of A.

According to another aspect, the invention provides a computer for processing seismic data. The computer comprises a memory and a processor. The memory stores seismic amplitude data A, seismic quadrature data Q, and GRE data. The processor computes GRE_equation and may compute other GRE data.

According to another aspect, the invention provides a computer readable medium containing computer executable code that when executed by a processor causes the processor to compute GRE data based on a seismic amplitude signal A and a seismic quadrature signal Q derived from seismic measurement data. The computed GRE data preserves a peak associated with a peak of A and preserves zero crossings associated with zero crossings of A.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 are graphs of seismic amplitude A, GRE_equation, and GRE_volume;

FIG. 6 are graphs of seismic amplitude A, GRE_loop, and Estrata_cube;

FIG. 7 is a graph of Xtreme_equation;

DETAILED DESCRIPTION OF THE INVENTION

Figure 1:
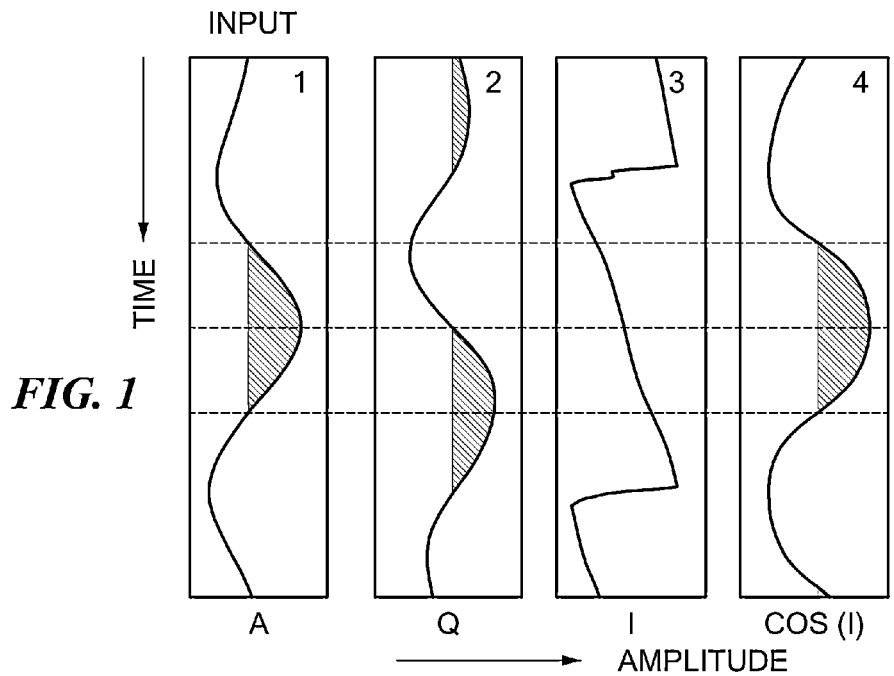
FIG. 1 are graphs of seismic amplitude A, seismic quadrature Q, instantaneous phase I of A, and a cosine of I.

Before describing in detail exemplary embodiments that are in accordance with the present invention, it is noted that the embodiments reside primarily in combinations of apparatus components and processing steps related to determining geological features from seismic data. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The present invention make uses of the seismic amplitude A and the seismic quadrature, Q to derive more detailed features of a subsurface structure. Q is the imaginary part of the complex seismic trace, and can be computed from the real trace A via the Hilbert transform. Both the real trace and its quadrature counterpart share the same amplitude spectrum: the quadrature trace, however, is rotated by 90 degrees. Zero-crossings on the real trace transform to peaks and troughs on the qudrature trace, and peaks and troughs on the real seismic trace transform to zero-crossings on the quadrature trace. The amplitude A and the quadrature Q are used in various mathematical combinations to compute other complex trace attributes that incorporate energy, frequency, and phase information.

A seismic cube of data obtained from measurements of acoustic waves propagating through the earth contains information about the subsurface. Generally, the vertical resolution of the seismic data is insufficient to properly delineate both the structural and stratigraphic features of a field such as an oil field. The methods described herein, applied to the seismic cube obtained from measurements, aid the seismic interpreter to identify subtle features of the subsurface structure of the earth. Although, principally discussed herein with reference to data as a function of time, the results discussed herein are also obtainable from data as a function of depth.

Referring now to the drawing figures, in which like reference designators denote like elements, there is shown in FIG. 1 a series of functions used to compute geological attributes of seismic data. Frame 1 of FIG. 1 shows an example of an amplitude function A of seismic data. Frame 2 of FIG. 1 shows the corresponding quadrature function Q of the seismic data. Frame 3 of FIG. 1 shows the instantaneous phase I of the seismic data and Frame 4 of FIG. 1 shows the cosine of I. These functions are input to a computer processor which computes various attributes of the seismic data as described herein.

Figure 2:
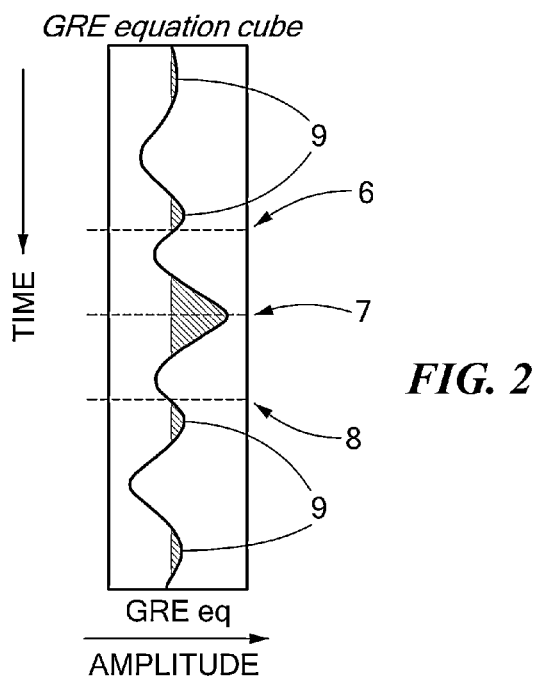
FIG. 2 is a graph of geometric reflectivity enhancement GRE_equation.

One such attribute is referred to herein as the geometric reflectivity enhancement (GRE) distribution which is computed as follows:

$$C = abs(A) - abs(Q)$$

$$D = abs(A_{90}) - abs(Q_{90})$$

$$GRE\_equation = (C-D)\cos(abs(I))$$

where abs indicates the absolute value function, $A_{90}$ is the seismic amplitude signal, A, phase shifted by substantially 90 degrees, $Q_{90}$ is the seismic quadrature signal, Q, phase shifted by substantially 90 degrees, and where I is the instantaneous phase of the seismic amplitude signal, A. This distribution is shown in FIG. 2, for the inputs of FIG. 1. Note that the peak 7 of the amplitude A, and the zero crossings 6, 8 of the amplitude A, shown in Frame 1 of FIG. 1, are preserved in the GRE_equation distribution of FIG. 2. Note also that new peaks 9 are introduced by the GRE_equation distribution, indicative of pseudo-reflectors that were not visible in the original amplitude function A. For this reason, the GRE_equation distribution may be referred to as a Pseudo-Reflectivity Series (PRS).

The distribution GRE_equation may be scaled by dividing it by its maximum and minimum amplitude values, so that the resultant distribution may be interpreted as a reflection coefficient in the range of 1 and −1. This may done according to the following equations:

$$PRS\_trough = If(GRE\_equation < 0, GRE\_equation/N, 0) >> N(\text{minimum value})$$

$$PRS\_peak = If(GRE\_equation > 0, GRE\_equation/M, 0) >> M(\text{maximum value})$$

$$GRE\_equation\_scaled = If(GRE\_equation > 0, PRS\_trough, PRS\_peak)$$

The GRE_equation distributions, as well as other distributions described herein, may not be used to detect or predict the presence of hydrocarbons, but may be used to delineate geomorphology and faults.

Figure 3:
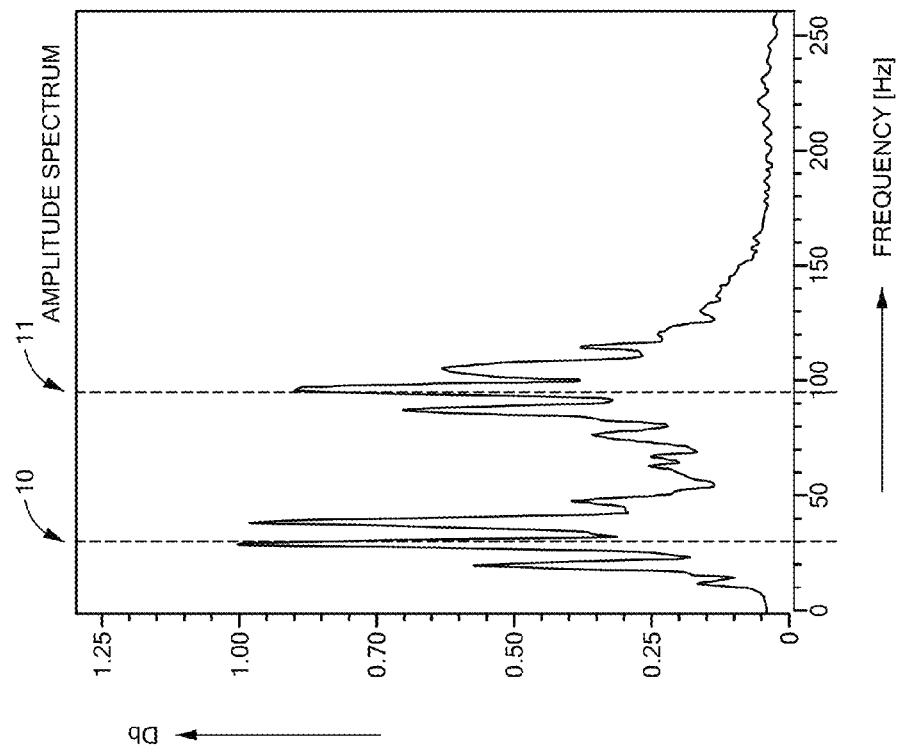
FIG. 3 is a graph of an amplitude spectrum of GRE_equation.

FIG. 3 depicts GRE_equation as a function of frequency, obtained by applying a Fourier transform to the distribution of Frame 5 of FIG. 2. A first peak 10 at about 30 Hertz (Hz) is followed by a second peak 11 at about 95 Hz. The first peak 10 corresponds to the first peak 7 of the GRE_equation data and the second peak 11 corresponds to PRS peaks 9 introduced in the GRE_equation data of FIG. 2.

Figure 4:
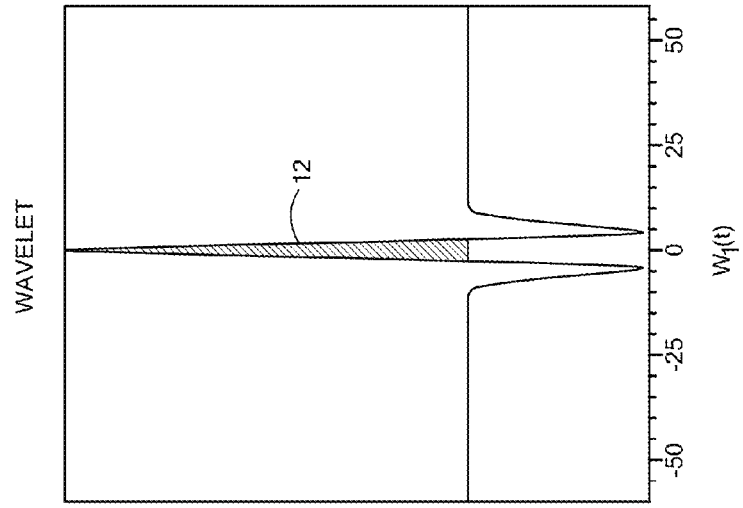
FIG. 4 is a graph of a wavelet function.

Another attribute that may be computed is referred to herein as GRE_volume computed from the GRE_equation distribution as $$GRE\_volume = GRE\_equation * W_1(t)$$

where "*" denotes convolution and $W_1(t)$ is a first wavelet function 12 as shown in FIG. 4. A frequency of the wavelet function $W_1(t)$ may be based on a frequency of a peak of the GRE_equation distribution. In one embodiment, the frequency of $W_1(t)$ may be chosen as twice the frequency of the PRS peaks 9 of FIG. 2. For example, if a dominant frequency of a peak is in the range of 15-17 Hz, then the frequency of the wavelet may be chosen to be in the range of 30-35 Hz. FIG. 5 shows the original amplitude data A in Frame 1 that was shown in FIG. 1, the GRE_equation data that was shown in FIG. 2, and the GRE_volume data computed as just described. As can be seen by comparison of GRE_equation and GRE_volume, the convolution process enhances the subtle changes in internal geometry of reflectors embedded in the data. In this way, lateral discontinuities corresponding to subtle faulting and stratigraphic features such as channels, onlaps, and truncations are more easily identified. Note that the GRE_volume data preserves the peak 7 and zero crossings 6, 8 of the original amplitude distribution A.

A next attribute that may be computed is referred to herein as GRE_loop, computed from GRE_volume as follows:

$$GRE\_loop = (abs(E) - abs(F)) - (abs(E_{90}) - abs(F_{90}))\cos(I_g)$$

where E is an amplitude of GRE_volume, F is a quadrature of GRE_volume, $E_{90}$ is E phase shifted by substantially 90 degrees, $F_{90}$ is F phase shifted by substantially 90 degrees and $I_g$ is an instantaneous phase of GRE_volume. FIG. 6, Frame 13 shows a graph of GRE_loop based on amplitude data A of Frame 1. As can be seen the frequency of irregularities of GRE_loop is about twice the frequency of the peaks of GRE_volume.

A seismic attribute that can be computed by wavelet analysis is called Estrata_cube, which is computed as follows:

$$Estrata\_cube = GRE\_loop * W_2(t)$$

where $W_2(t)$ is a second wavelet function having a higher frequency than the first wavelet function, $W_1(t)$. For example, if the frequency of $W_1(t)$ is 30-35 Hz, then the frequency of $W_2(t)$ may be selected to be 60-70 Hz. A graph of the Estrata_cube is shown in Frame 14 of FIG. 6. This equation will yield more detail than the amplitude data A shown in Frame 1, and may be input to commercially available fault detector algorithms such as Semblance Cube®, Variance Cube®, and Coherence Cube®. Estrata_cube allows seismic interpreters to produce more accurate structural maps that delineate fault systems and facilitate understanding of the compartmentalization of the sub surface structure. Note also, that the peak 7 and zero crossings 6 and 8 of the original amplitude distribution A are preserved by the Estrata_cube equation.

Figure 8:
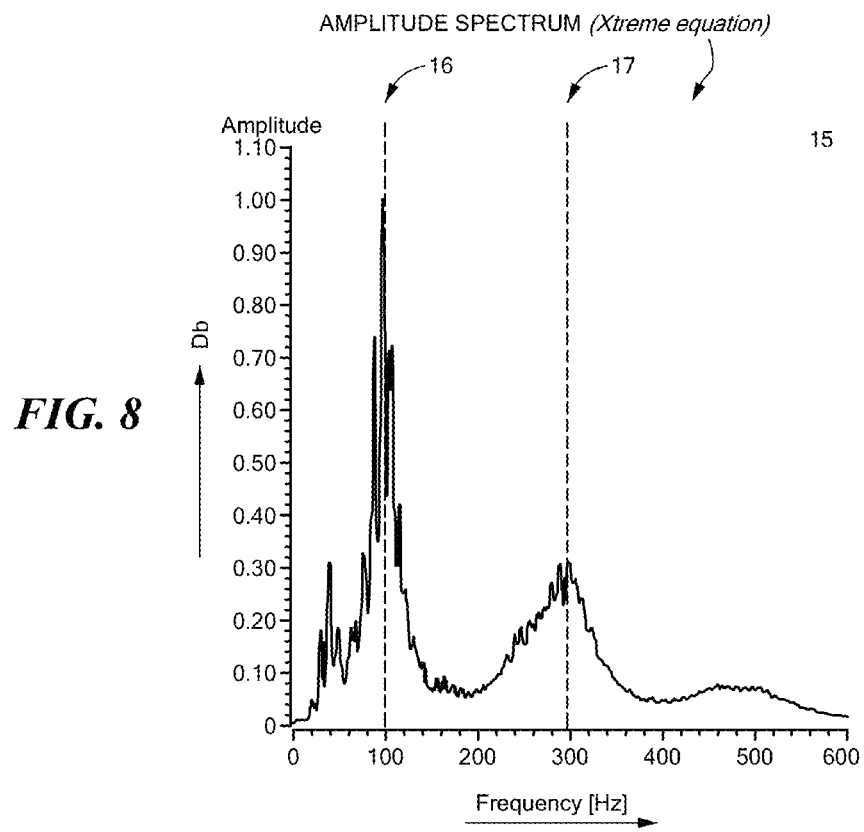
FIG. 8 is a graph of an amplitude spectrum of Xtreme_equation.
Figure 9:
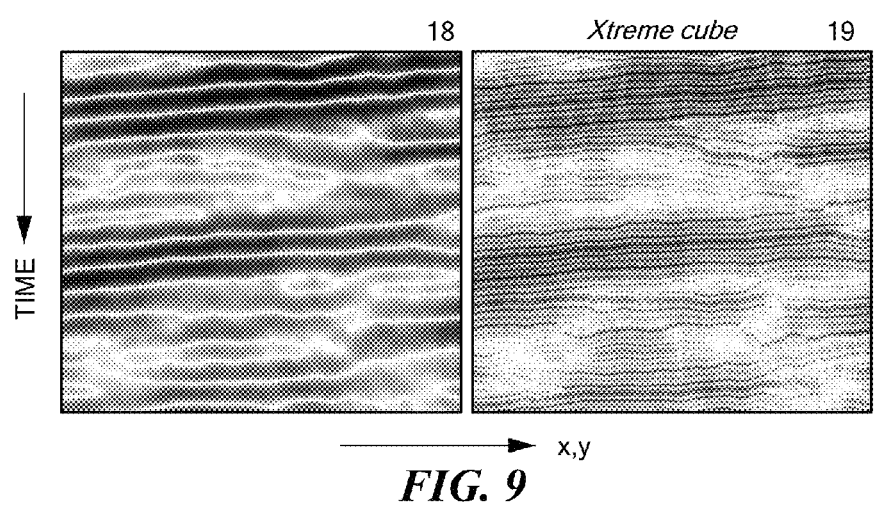
FIG. 9 is a plot of seismic amplitude data and a plot of Xtreme_cube.

An attribute that identifies extrema of the seismic trace is called Xtreme_equation and is shown in FIG. 7. This function is computed as follows:

$$att1 = abs(E) - abs(F)$$

$$att2 = \cos(att1)$$

$$att3 = If(att2 > 0, att1, 0)$$

$$att4 = -att3$$

$$Xtreme\_equation = If(amp1 < 0, att4, att3)$$

where E is an amplitude of GRE_volume and F is a quadrature of GRE_volume obtained from the Hilbert transform of E. The amplitude spectrum of Xtreme_equation is shown in FIG. 8. Two peaks are shown at about 180 Hz and about 300 Hz. The frequency of the second peak at about 300 Hz can be used as the frequency of a third wavelet $W_3(t)$ to convolve with Xtreme_equation to produce a function referred to as Xtreme_cube, as follows:

$$Xtreme\_cube = Xtreme\_equation * W_3(t)$$

where $W_3(t)$ is the third wavelet function. A two dimensional input amplitude distribution is shown in Frame 18 of FIG. 9 and the resultant Xtreme_cube distribution is shown in Frame 19 of FIG. 9.

Figure 10:
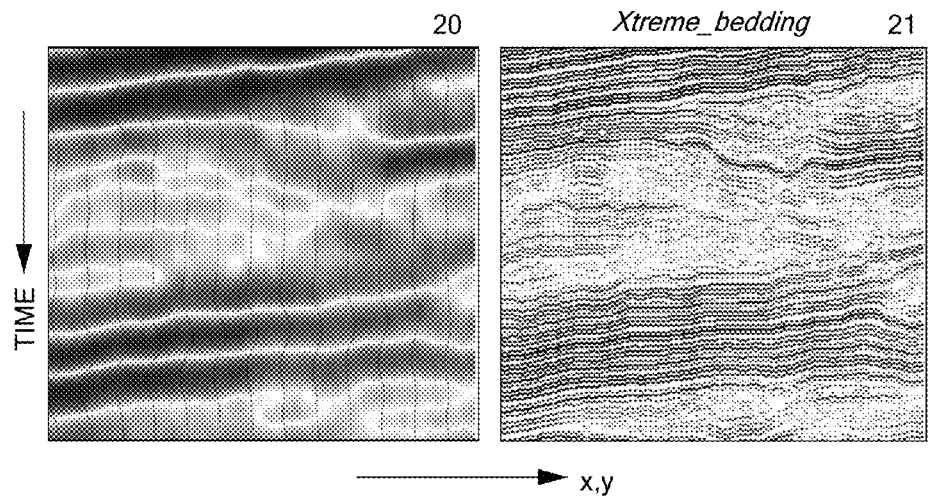
FIG. 10 is a plot of seismic amplitude data and a plot of Xtreme_bedding.

Another attribute is referred to herein as Xtreme_bedding which is computed as follows:

$$pol = apparent\_polarity\_of\_Xtreme\_cube$$

$$Xtreme\_bedding = If(pol = 1, Xtreme\_cube, If(pol = -1, Xtreme\_cube, 0))$$

where pol is a sign of an instantaneous phase at reflection strength maxima of the function Xtreme_cube. An input amplitude distribution is shown in Frame 20 of FIG. 10 and a resultant Xtreme_bedding distribution is shown in Frame 21 of FIG. 10. This distribution can be used to identify reflectivity patterns, angularities, truncations and internal terminations of seismic reflectors.

Figure 11:
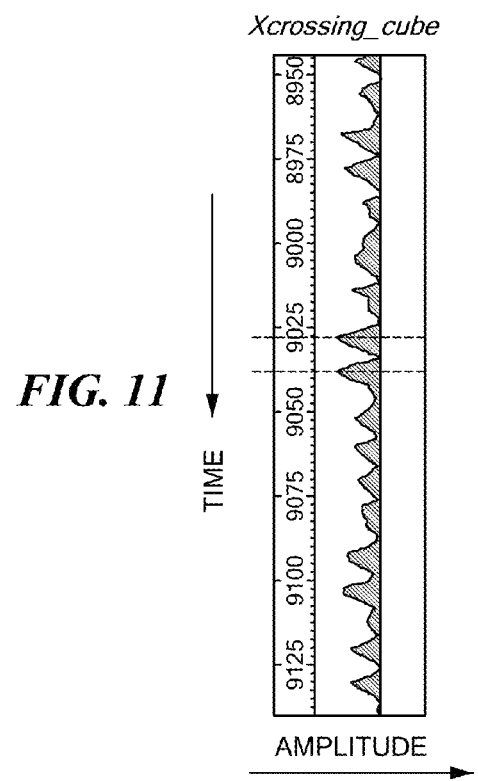
FIG. 11 is a graph of Xcrossing_cube.

Another attribute that is referred to herein as Xcrossing_cube is based on zero crossings of the Estrata_cube distribution, and is computed as follows:

$$G = abs(Xa) - abs(Xq)$$

$$H = abs(Xa_{90}) - abs(Xa_{-90})$$

$$Xcros \sin g\_cube = If(G - H > 0, 0, (G - H))$$

where Xa is an amplitude of Estrata_cube, F is a quadrature of Estrata_cube, $Xa_{90}$ is Xa phase shifted by substantially 90 degrees, $Xa_{-90}$ is Xa phase shifted by substantially minus 90 degrees. The distribution is shown in FIG. 11.

Figure 12:
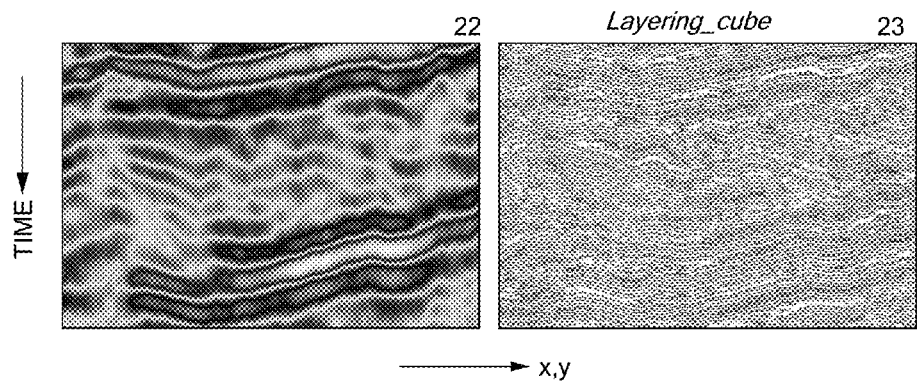
FIG. 12 is a plot of seismic amplitude data and a plot of Layering_cube.

Another attribute referred to herein as Layering_cube is computed as follows:

$$EP = apparent\_polarity\_of\_Estrata\_cube$$

$$XP = apparent\_polarity\_of\_Xcross\_cube$$

$$Layering\_cube = If(XP = -1, XP, If(EP = -1, 1, If(EP = 1, 2, 0)))$$

where the apparent polarity is a sign of an instantaneous phase of the corresponding function. An input amplitude distribution A, Frame 22, and a resulting Layering_cube distribution, Frame 23, are shown in FIG. 12. The layering_cube distribution helps to identify the internal reflectivity pattern of a sand package, so that internal surfaces can be interpreted to accurately delineate the geometry of a reservoir.

Figure 13:
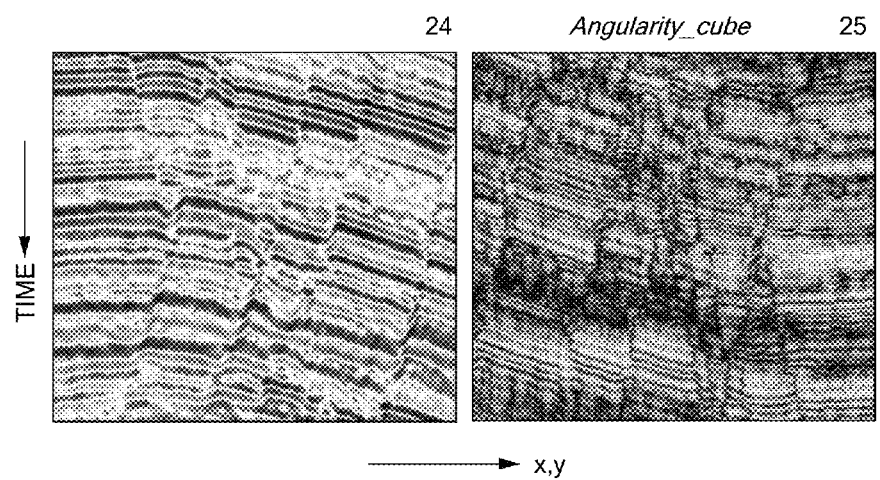
FIG. 13 is a plot of seismic amplitude data and a plot of Angularity_cube.

Another attribute referred to herein as Angularity_cube is computed as follows:

$$\text{Angularity\_cube} = abs(E) - abs(F)$$

where E is the amplitude of GRE_equation and F is the quadrature of GRE_volume. An input amplitude distribution A, Frame 24, and the resulting Angularity_cube distribution, Frame 25, are shown in FIG. 13. The Angularity_cube distribution can be used to improve the delineation of the structural setting, minor faulting and compartmentalization of a reservoir.

Figure 14:
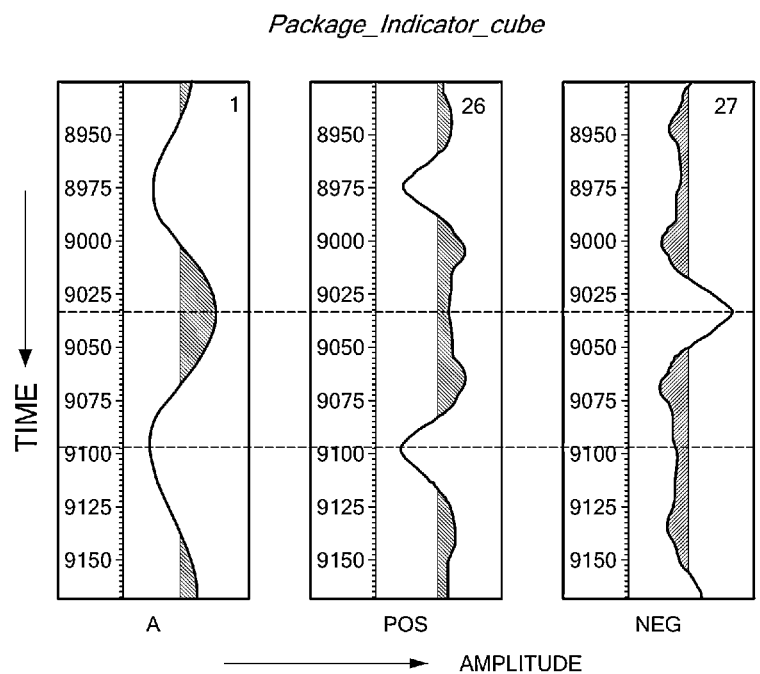
FIG. 14 is a graph of seismic amplitude A, and graphs of positive and negative package_indicator_cube.

Another set of attributes are defined as:

$$\text{package\_indicator\_pos} = abs(C)\cos(abs(I)) + D$$

$$\text{package\_indicator\_neg} = abs(C)\cos(abs(I)) - D$$

where C, D and I are given above. The distributions enhance the seismic intervals between peaks and between troughs, and are used mainly to identify seismic packages and to interpret seismic horizons. Geometry, continuity and faulting are enhanced to facilitate the task of producing a final structural map of a reservoir. The original input amplitude distribution A, Frame 1 is shown and the resulting package functions are shown in Frames 26 and 27 of FIG. 14.

Figure 15:
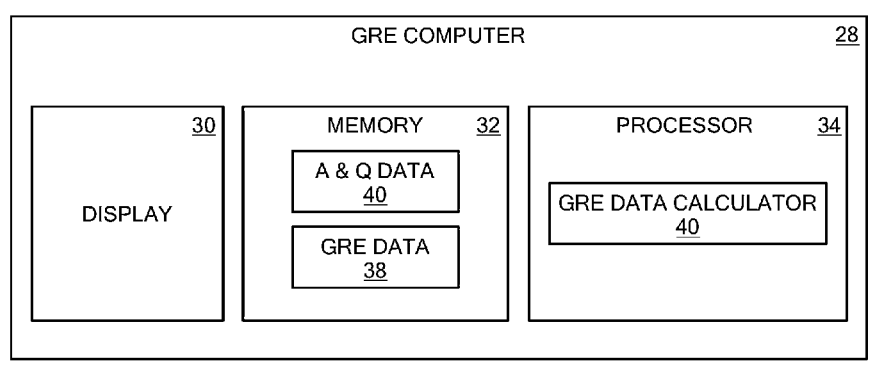
FIG. 15 is a block diagram of a GRE computer constructed in accordance with principles of the present invention.

FIG. 15 shows an exemplary GRE computer 28 constructed in accordance with the present invention that performs the computations discussed herein and displays the results of the computations on a display 30 to aid in seismic interpretation. The GRE computer 28 includes a memory 32 and a processor 34. The memory 32 includes storage of seismic amplitude data A and seismic quadrature data Q 36, and GRE data 38 determined by a GRE data calculator 40 of the processor 34.

Figure 16:
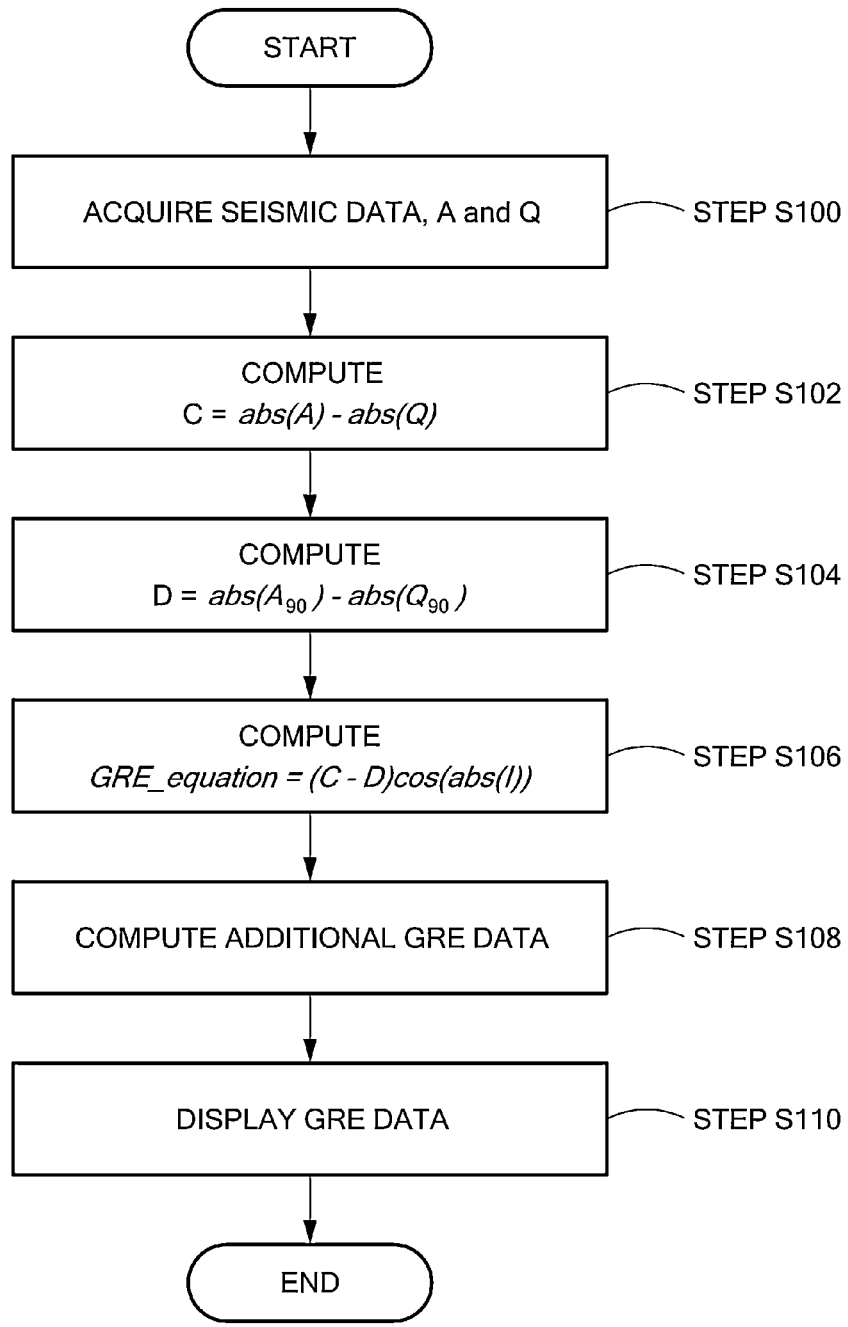
FIG. 16 is a flow chart of an exemplary process for computing GRE data.

FIG. 16 is a flow chart of an exemplary process for computing GRE data. Seismic data A and Q is acquired (step S100). Then, a difference between the absolute values of A and Q are computed (step S102). A difference between the absolute values of the phase shifted values, $A_{90}$ and $Q_{90}$ are also computed (step S204). The GRE distribution referred to herein as GRE_equation is computed (step S106). Other GRE data discussed herein is also computed (step S108). The computed GRE data is displayed (step S110). The display may be two or three dimensional. The displayed attributes computed as described herein may provide visual indication of features of a subsurface structure that are not visible by displaying A and Q alone.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Thus, one embodiment is a computer readable medium containing non-transitory computer-executable code that when executed by a processor causes the processor to perform functions for processing seismic data. The functions include computing a geometric reflectivity enhancement (GRE) distribution based on an amplitude signal, A, and a quadrature signal, Q, A and Q being derived from seismic measurement data. The GRE distribution preserves a peak associated with a peak of A and preserves zero crossings associated with zero crossings of A. In some embodiments, the GRE distribution is based on absolute values of A and Q and an instantaneous phase of A. The GRE distribution may be convolved with a wavelet function to produce a secondary distribution to enhance the illustration of seismic features.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of detecting geological features from seismic data, the method comprising:

processing a seismic amplitude signal, A, and processing a seismic quadrature signal, Q, A and Q derived from seismic measurement data, the seismic amplitude signal A being the magnitude of a complex seismic trace, and the seismic quadrature signal, Q, obtained from a Hilbert transform of a real part of the complex seismic trace;

the processing of the seismic amplitude and seismic quadrature signals producing a geometrical reflectivity enhancement (GRE) distribution indicative of the geological features, the processing of the seismic amplitude and seismic quadrature signals including computing:

$$C = abs(A) - abs(Q);$$

$$D = abs(A_{90}) - abs(Q_{90}); \text{ and}$$

$$\text{GRE\_equation} = (C-D)\cos(abs(I))$$

where abs indicates the absolute value function, $A_{90}$ is the seismic amplitude signal, A, phase shifted by substantially 90 degrees, $Q_{90}$ is the seismic quadrature signal, Q, phase shifted by substantially 90 degrees, and where I is an instantaneous phase of the seismic amplitude signal, A; and displaying results of the processing, the displayed results indicative of at least one of the geological features.

2. The method of claim 1, wherein the processing further includes computing:

$$\text{GRE\_volume} = \text{GRE\_equation} * W_1(t)$$

where "*" denotes convolution and $W_1(t)$ is a first wavelet function.

3. The method of claim 2, wherein the processing further includes computing:

$$\text{GRE\_loop} = (abs(E) - abs(F)) - (abs(E_{90}) - abs(F_{90}))\cos(I_g)$$

where E is an amplitude of GRE_volume, F is a quadrature of GRE_volume, $E_{90}$ is E phase shifted by substantially 90 degrees, $F_{90}$ is F phase shifted by substantially 90 degrees and $I_g$ is an instantaneous phase of GRE_volume.

4. The method of claim 3, wherein the processing further includes computing:

$$Estrata\_cube = GRE\_loop * W_2(t)$$

where $W_2(t)$ is a second wavelet function having a higher frequency than the first wavelet function, $W_1(t)$.

5. The method of claim 4, wherein the processing further includes computing:

$$G = abs(Xa) - abs(Xq)$$

$$H = abs(Xa_{90}) - abs(Xa_{-90})$$

$$Xcross\_cube = If(G-H>0, 0, (G-H))$$

where Xa is an amplitude of Estrata, F is a quadrature of Estrata_cube, $Xa_{90}$, is Xa phase shifted by substantially 90 degrees, $Xa_{-90}$ is Xa phase shifted by substantially minus 90 degrees.

6. The method of claim 5, wherein the processing further includes computing:

$$EP = apparent\_polarity\_of\_Estrata$$

$$XP = apparent\_polarity\_of\_Xcross\_cube$$

$$Layering\_cube = If(XP=-1, XP, If(EP=-1, 1, If(EP=1, 2, 0))).$$

7. The method of claim 2, wherein the processing further includes computing:

$$att1 = abs(E) - abs(F)$$

$$att2 = \cos(att1)$$

$$att3 = If(att2>0, att1, 0)$$

$$att4 = -att3$$

$$Xtreme\_equation = If(amp1<0, att4, att3)$$

where E is an amplitude of GRE_volume and F is a quadrature of GRE_volume.

8. The method of claim 7, wherein the processing further includes computing:

$$Xtreme\_cube = Xtreme\_equation * W_3(t)$$

where $W_3(t)$ is a third wavelet function.

9. The method of claim 8, wherein the processing further includes computing:

$$pol = apparent\_polarity\_of\_Xtreme\_cube$$

$$Xtreme\_bedding = If(pol=1, Xtreme\_cube, If(pol=-1, Xtreme\_cube, 0))$$

where pol is a sign of an instantaneous phase at reflection strength maxima of the function Xtreme_cube.

10. The method of claim 1, wherein the processing further includes computing:

$$Angularity\_cube = abs(E) - abs(F)$$

where E is the amplitude of GRE_equation and F is the quadrature of GRE_equation.

11. The method of claim 1, wherein the processing includes computing:

$$package\_indicator\_pos = abs(C)\cos(abs(I)) + D$$

$$package\_indicator\_neg = abs(C)\cos(abs(I)) - D.$$

12. A computer for processing seismic data, the computer comprising:
a memory, the memory storing amplitude seismic data, A, quadrature seismic data, Q, and computed geometric reflectivity enhancement GRE data; and
a processor in communication with the memory, the processor configured to process the seismic amplitude and seismic quadrature signals producing a geometrical reflectivity enhancement (GRE) distribution indicative of at least one geological feature, the processing of the seismic amplitude and seismic quadrature signals including computing:

$$C = abs(A) - abs(Q);$$

$$D = abs(A_{90}) - abs(Q_{90}); \text{ and}$$

$$GRE\_equation = (C-D)\cos(abs(I))$$

where abs indicates the absolute value function, $A_{90}$ is the seismic amplitude signal, A, phase shifted by substantially 90 degrees, $Q_{90}$ is the seismic quadrature signal, Q, phase shifted by substantially 90 degrees, and where I is an instantaneous phase of the seismic amplitude signal, A; and
a display in communication with the processor, the display displaying results of the computing to indicate at least one of the geological features.

13. The computer of claim 12, wherein the processor further computes:

$$GRE\_volume = GRE\_equation * W_1(t)$$

where "*" denotes convolution and $W_1(t)$ is a first wavelet function, the first wavelet function having a frequency based on a dominant frequency of GRE_equation.

14. A computer readable medium containing computer-executable programmatic code that when executed by a processor causes the processor to:
compute a geometric reflectivity enhancement (GRE) distribution based on processing a seismic amplitude signal, A, and a seismic quadrature signal, Q, A and Q derived from seismic measurement data, the GRE distribution indicative of at least one geological feature, preserving a peak associated with a peak of A and preserving zero crossings associated with zero crossings of A, processing including computing:

$$C = abs(A) - abs(Q);$$

$$D = abs(A_{90}) - abs(Q_{90});$$

$$GRE\_equation = (C-D)\cos(abs(I)); \text{ and}$$

display the results of the processing, the displayed results indicative of at least one of the geological features.

15. The computer readable medium of claim 14, wherein the GRE distribution is based at least in part on absolute values of A and Q and an instantaneous phase of A.

16. The computer readable medium of claim 14, wherein the functions further include convolving the GRE distribution with a first wavelet function to produce a GRE volume distribution.

17. The computer readable medium of claim 16, wherein a frequency of the first wavelet function is based at least in part on a frequency at which a peak of the GRE distribution occurs.

18. The computer readable medium of claim 16, wherein the functions further include computing a GRE loop distribution based at least in part on absolute values of an amplitude function and a quadrature function of a result of the convolving.

19. The computer readable medium of claim 18, wherein the functions further include convolving the GRE loop distribution with a second wavelet function to produce an Estrata cube distribution.

20. The computer readable medium of claim 19, wherein a frequency of the second wavelet function is based at least in part on a frequency at which a peak of the GRE loop distribution occurs.

* * * * *